(12) United States Patent
Golomb et al.

(10) Patent No.: US 8,549,649 B2
(45) Date of Patent: Oct. 1, 2013

(54) SYSTEMS AND METHODS FOR SENSITIVE DATA REMEDIATION

(75) Inventors: Gary J. Golomb, New Windsor, MD (US); Kevin T. Douglas, Vienna, VA (US); Brian P. Girardi, Chantilly, VA (US)

(73) Assignee: EMC Corporation, Hopkinton, MA (US)

( * ) Notice: Subject to any disclaimer, the term of this patent is extended or adjusted under 35 U.S.C. 154(b) by 275 days.

(21) Appl. No.: 12/761,751

(22) Filed: Apr. 16, 2010

(65) Prior Publication Data

US 2010/0281543 A1    Nov. 4, 2010

Related U.S. Application Data

(60) Provisional application No. 61/174,163, filed on Apr. 30, 2009.

(51) Int. Cl.
*G06F 11/00* (2006.01)
*G06F 21/00* (2006.01)
*H04J 3/16* (2006.01)

(52) U.S. Cl.
USPC ............. 726/25; 726/23; 726/24; 713/182; 370/468

(58) Field of Classification Search
USPC ...... 713/153–154, 187–188, 193–194; 726/1, 726/13, 22–33; 709/206, 249, 389
See application file for complete search history.

(56) References Cited

U.S. PATENT DOCUMENTS

| | | | |
|---|---|---|---|
| 2003/0236995 | A1 | 12/2003 | Fretwell, Jr. |
| 2004/0078384 | A1* | 4/2004 | Keir et al. ................ 707/102 |
| 2007/0143851 | A1 | 6/2007 | Nicodemus et al. |
| 2007/0240218 | A1 | 10/2007 | Tuvell et al. |
| 2008/0229420 | A1 | 9/2008 | Jeschke et al. |
| 2010/0082513 | A1* | 4/2010 | Liu ............................ 706/46 |

OTHER PUBLICATIONS

PCT International Search Report and Written Opinion, PCT/US2010/31571 (10 pages).

* cited by examiner

*Primary Examiner* — Evans Desrosiers
(74) *Attorney, Agent, or Firm* — Edell, Shapiro & Finnan, LLC

(57) ABSTRACT

Systems and methods for sensitive data remediation include calculating a Probability of Loss of data on a given computer based on measures of control, integrity, and potential avenues of exploitation of the given computer, determining an Impact of Loss of the data on the given computer based on a type, volume, and nature of the data, and correlating the Probability of Loss with the Impact of Loss to generate a risk score for the given computer that can be compared to other computers in the network. The computers with higher risk scores can then be subjected to data remediation activity.

17 Claims, 8 Drawing Sheets

SYSTEMS AND METHODS FOR SENSITIVE DATA REMEDIATION

This application claims the benefit of U.S. Provisional Application No. 61/174,163, filed Apr. 30, 2009, which is incorporated herein by reference in its entirety.

FIELD OF THE INVENTION

Embodiments of the present invention relate to computer network auditing, and more particularly to systems and methods for characterizing risk of loss of data from respective computers in a network, and reducing that risk via remediation techniques.

BACKGROUND OF THE INVENTION

Computer hacking, malware, worms, and other computer related mischief undertaken or caused by people with either benign or malicious intent is of grave concern to businesses, particularly those that rely on expansive computer networks. Indeed, a breach of an organization's network, including even a single computer on that network, may result in direct and indirect financial loss, the latter including loss associated with legal fees, fines, etc.

In is therefore important for organizations to have as much control and understanding as possible of the nature of their computer networks. In connection with this understanding, it is important to have an idea of the type of data, and particularly whether "sensitive data" resides or happens to be stored on given computers at any given time.

Sensitive data is typically defined one of two ways. It can include data types that are protected though policies and regulations such as the Health Insurance Portability and Accountability Act (HIPAA), Federal Information Security Management Act (FISMA), Sarbanes-Oxley Act (SOX), and Payment Card Industry Standards (PCI), where the data may include social security numbers (SSNs), credit card numbers, bank account numbers, phone numbers and addresses, or the like; or sensitive data can include data types that are specific to an organization, such as customer ID numbers, board meeting minutes, source code, designs, recipes, trade secrets, and the like.

Only a small handful of products presently available in the marketplace are capable of scanning a computer for "sensitive data." Significantly, however, such products neglect the security of that data.

Security is typically defined as the controls employed to prevent unauthorized access to given data. While there exist products that are capable of assessing the security of a given computer (e.g., by detecting malware, viruses, mis-configurations, restricted applications, etc.), such products do not have the ability to determine whether data stored on given computer, which computer is deemed to be a security risk, is considered "sensitive."

There is accordingly a need to provide more comprehensive methods and systems that can provide computer network managers the ability to have confidence that sensitive data is not being compromised, or that the chances of such a compromise is reduced as much as possible.

SUMMARY OF THE INVENTION

Embodiments of the present invention provide systems and methods for reducing the risk that sensitive data, which is stored on network computers, presents to network managers. In one embodiment, agents are deployed, e.g., on respective computers among a plurality of computers throughout a computer network. Using the agents, information is collected about the type of data stored on the respective computers (i.e., how sensitive the data is) as well as the programs running on, the configuration of and location of the respective computers (i.e., how secure the computer is). That information may then be received from the agents at a central location, e.g. a server, on a periodic basis or upon request. Then, for each computer having an agent deployed thereon, a risk score is calculated, where the risk score is based on the impact of potential loss of the sensitive data, and the probability that the data could be lost in the first place. The risk scores of multiple computers are compared and the computers are ranked in a risk score order. Those computers ranking higher than others are deemed to be the most at risk for compromise. For at least those computers, some form of remediation of risk is performed. Remediation can be automatic, or be performed manually by a user or an administrator. Remediating security risk can include techniques such as changing a configuration, uninstalling an application, installing an application, executing an application, or disabling a running service, from a given one of the multiple computers in the ranking, hence minimizing the probability of loss. More importantly, data risk remediation can include techniques such as deleting data, moving data to another directory, moving data to another computer, or encrypting the data that gave rise to an elevated risk score, hence eliminating impact of loss.

These and other features of embodiments of the present invention, and their attendant advantages, will be more fully appreciated upon a reading of the following detailed description in conjunction with the accompanying drawings.

DETAILED DESCRIPTION

Figure 1:
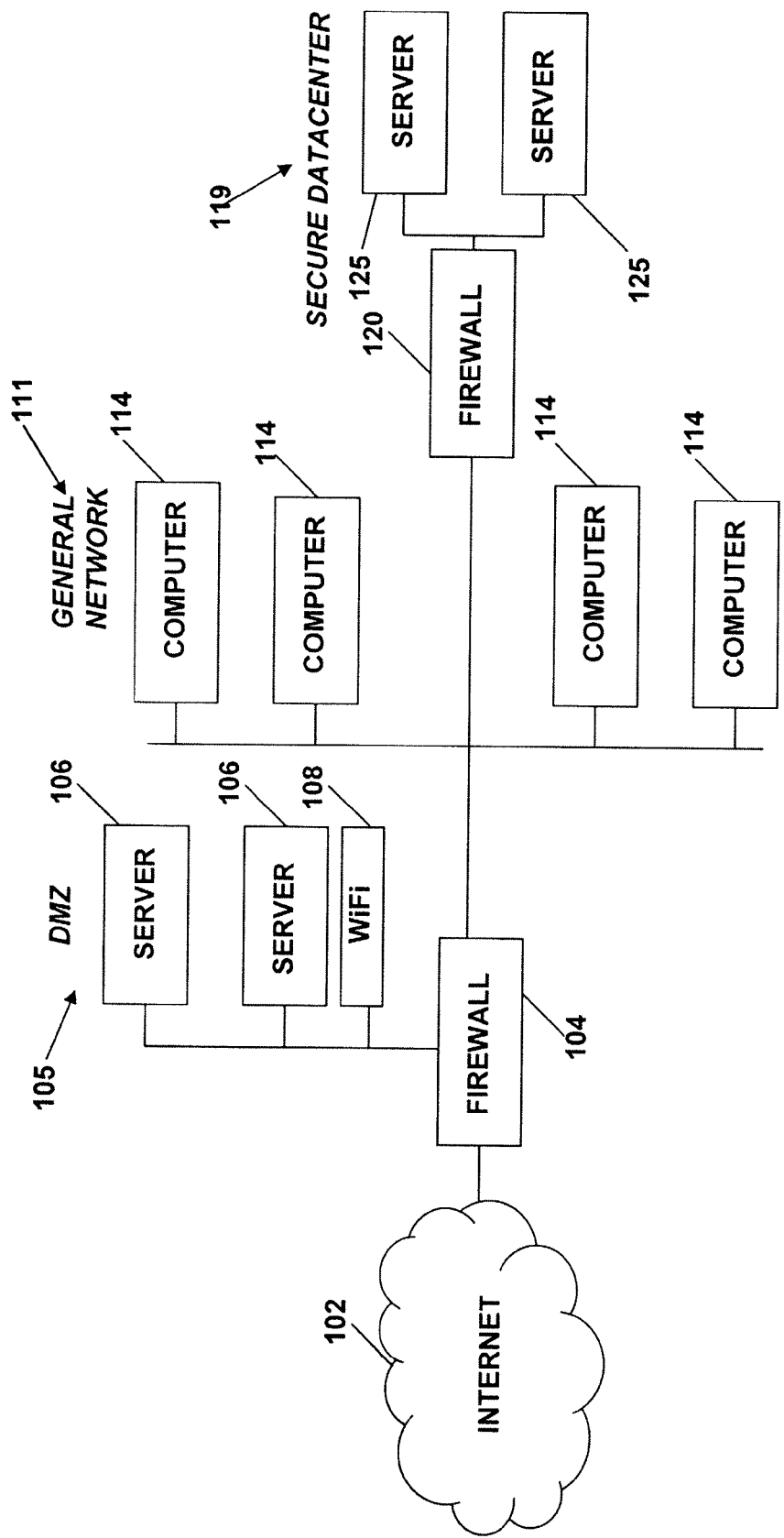
FIG. 1 is a schematic diagram of a network in which embodiments of the present invention may operate.

FIG. 1 is a schematic diagram of a network in which embodiments of the present invention may operate. As shown, a network 102, such as the internet, is connected to several general categories of network entities, including a "demilitarized zone" (DMZ) 105, a general network 111, and a secure data center 119. The DMZ 105 is connected to the internet 102 (and thus other network components, entities, etc.) via a firewall 104. This portion of the DMZ 105 may include, for example, multiple servers 106, and wireless fidelity (WiFi) connectivity 108, among other possible outlets.

Likewise, general network 111 may include multiple general purpose computers 114, workstations, etc. These devices, like those within the DMZ 105 can be connected with virtually any other network device via internet 102.

Finally, secure data center 119 includes servers 125 that can communicate with the "outside world" via, perhaps, a more robust firewall 120 than firewall 104. Typically, secure data center 119, stores sensitive data including, but not limited to, proprietary company information such as intellectual property, plans, financial statements, customer lists, credit card numbers, social security numbers, bank account numbers, and the like. From time to time, it is not unusual for some sensitive data to be stored on a computer outside of the secure data center 119, e.g., during a data entry process prior to being uploaded to the secure data center 119, or after downloading some of the sensitive data for processing outside of the secure data center 119. In either case, it is possible that sensitive data might remain on one or more computers outside of the secure data center. That sensitive data represents a security risk to the organization in that the sensitive data on such a computer is more vulnerable to attack and hacking.

Figure 2:
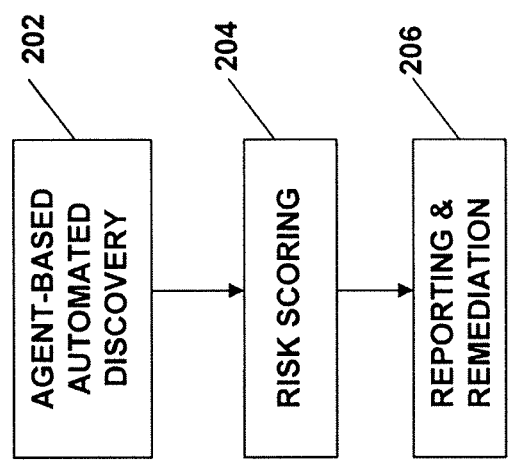
FIG. 2 shows a flow chart of a method in accordance with the present invention.

FIG. 2 shows a flow chart of a method in accordance with the present invention. At one level, an embodiment of the present invention is configured to automatically discover the type of data that may reside or be stored on a give computer, and is further configured to automatically analyze the security state of that computer. In a preferred embodiment, this automation is made possible by an agent (or binary code) that operates on the computer (and, in fact, on multiple, if not all, computers in a given network). The agent preferably sends its "findings" to a central server with which it is configured to communicate. The foregoing is represented by step 202 in FIG. 2.

More specifically, at step 204, a central server receives the findings of all the agents in the network, and generates a risk score to characterize the risk that each computer poses to the organization. More specifically, risk scoring, as will be explained in more detail later herein, comprises an assessment of and correlation between both the type of data stored on respective computers, and the probability that respective computers are susceptible to being hacked, or compromised, in any way. Importantly, risk scoring can be performed by a central server, or by the agent operating on the computer. In the latter instance, the "findings" that are received by the central server may include only the risk score calculated by the local agent.

Once risk scores are obtained for each of the several computers in the network, those computers with elevated scores compared to the other computers can be tended to, as indicated by step 206. In particular, those computers having elevated scores may be reported to a network manager. More importantly, however, some sort of remediation with respect to the computers having elevated scores is preferably carried out. Remediation techniques may include deleting the identified sensitive data, moving such sensitive data to the secure data center 119, changing the access privileges for the computers at issue, quarantining the information, or encrypting the data, among other possible remediation efforts.

Figure 3:
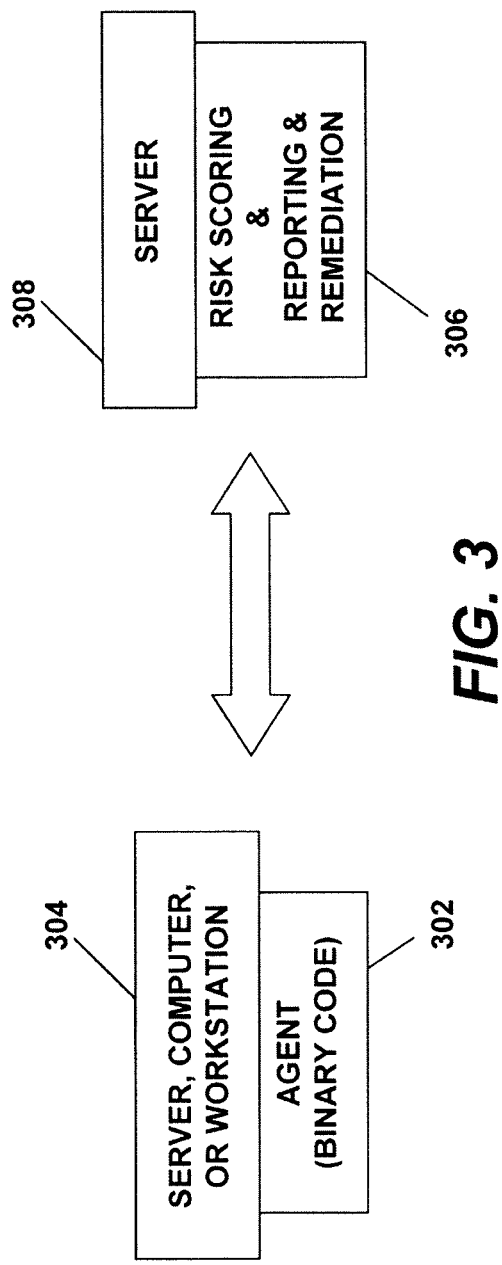
FIG. 3 shows network devices that are configured to operate in accordance with an embodiment of the present invention.

Consistent with the foregoing, FIG. 3 shows network devices that are configured to operate in accordance with an embodiment of the present invention. That is, a client scanning engine binary or agent 302 is provided. Agent 302 may be software that is pushed to a server, computer or workstation 304 outside of secure data center 119. Alternatively, the agent can be delivered via a USB memory stick or other portable device. In yet another alternative, the hardware of server, computer or workstation 304 can be designed to include the routines necessary to carry out the analyses that are described more fully later herein.

In any event, the agent 302 is in communication with a server 308, typically disposed behind a more robust firewall. That server is preferably a computing device comprising hardware and software, as is well understood by those skilled in the art. A risk scoring and reporting and remediation module 306 preferably operates on server 308. Module 306 receives the findings of the several agents deployed throughout the network and generates the risk scores for the computers, and then initiates appropriate remedial action in an effort, effectively, to reduce the risk score of selected computers 304.

Figure 4:
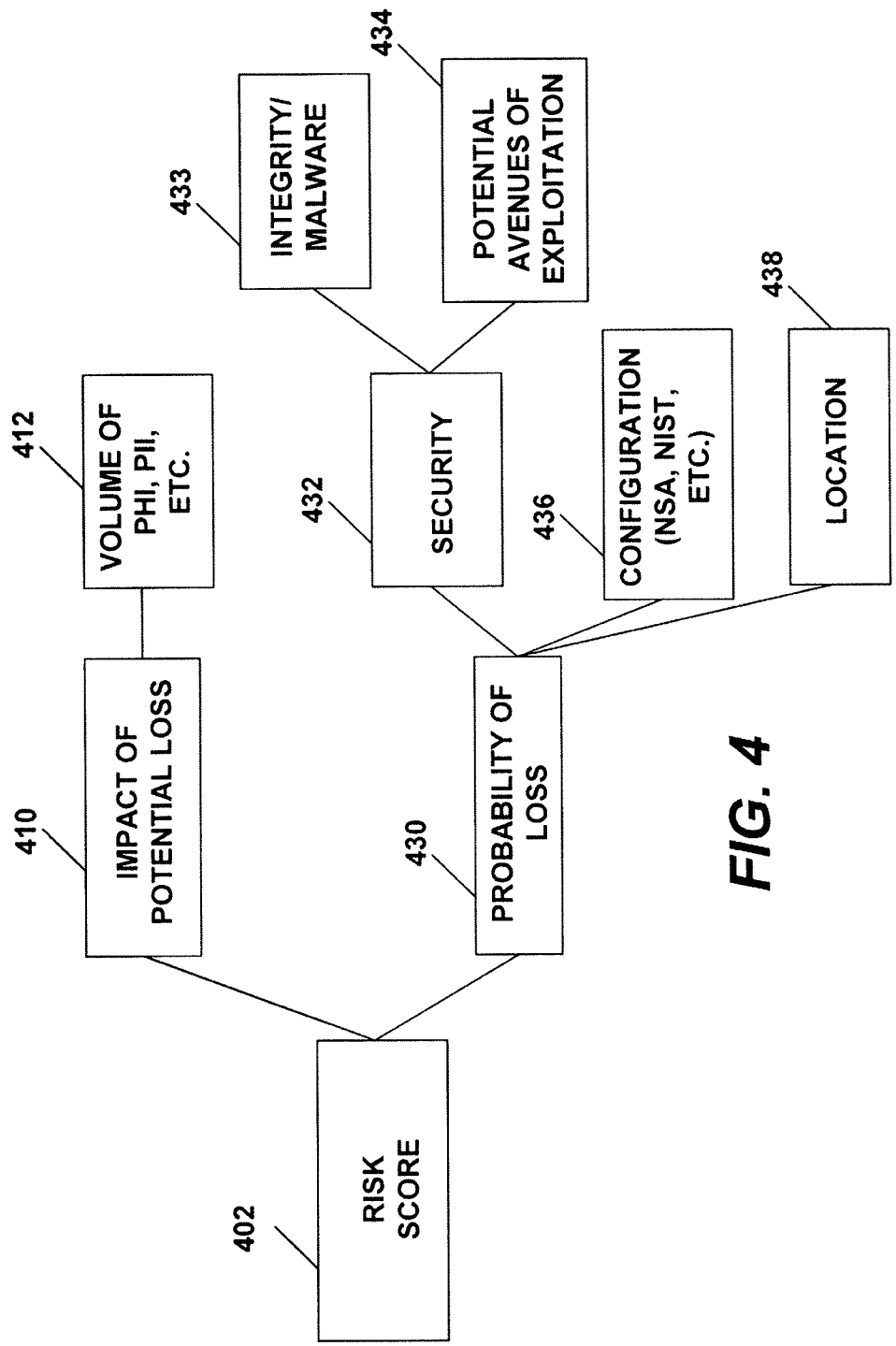
FIG. 4 shows metrics or variables that may be taken into account to generate a risk score in accordance with an embodiment of the present invention.

FIG. 4 shows metrics or variables that may be taken into account to generate a risk score in accordance with an embodiment of the present invention. The risk score 402 is preferably based on two overall variables or metrics: impact of potential loss of data 410 and probability of loss of that data 430.

The impact of potential loss of data 410 is based on the nature (e.g., a sensitive, important, "secret formula") and/or volume of, e.g., selected Protected Health Information (PHI) or Personally Identifiable Information (PII) 412. Thus, for example, thousands of social security numbers and credit card numbers stored on a given computer that could be compromised is more worrisome than a similarly-situated computer having only a single social security number stored thereon. Thus, a component of the risk score 402 is a metric that represents the impact of the potential loss 410 of the data in question. Further, the type of information is taken into consideration as well, such that a file containing 100 phone numbers and addresses would not be considered as sensitive as a file with 100 SSNs or bank account numbers.

The risk score 402 is also based on a probability of loss metric 430, or, in other words, how likely it is that the data stored on a given computer can be compromised, e.g., obtained by unauthorized persons, maliciously deleted, etc. Probability of loss 430 is calculated based on several inputs, including security 432 of a given computer, the configuration 436 of that computer, and the location 438 (both physical and logical) of the computer.

Security 432 is determined based on how the computer may be compromised. For instance, security 432 may take into account the integrity 433 of the computer including whether the computer appears to host any malware (e.g., virus, worms, etc.), as well as potential avenues of exploitation 434.

Examples of metrics used to determine metrics 433 and 434, and thus security metric 432, include:
  number of potential signs of malware;
  number of potential signs of "rootkits";
  number of hidden executable files;
  number of days since a last audit;
  the programs currently operating on the computer;
  signature-based vulnerabilities;
  known mis-configurations;
  network connections; and
  potential network connections.
  Numeric values are assigned to these metrics.

Also preferably entering into the calculus of the probability of loss 430 is the configuration 436 of the computer. For example, this metric may take into account National Security Agency (NSA), and National Institute of Standards and Technology (NIST) standards for configuration and vulnerability analysis such as the Security Content Automation Protocol (SCAP), the Federal Desktop Core Configuration (FDCC), or the NSA Gold Standard templates.

Finally, the probability of loss metric 430 preferably takes into account the location 438 of the computer being audited. This location may be a physical location (e.g., an unguarded facility with few personnel) or may be a logical location on the network (e.g., not protected by a preferred firewall).

Once values are calculated for each of the foregoing metrics, a risk score can be calculated as well.

The following illustrates an example technique for calculating a risk score 402.

$$Score = Score_{MAX} - R_{HV} - R_V - R_E - R_I$$

Where:
$R_{HV}$=Assurance reduction for highly valuable information
$R_V$=Assurance reduction for information with any value
$R_E$=Assurance reduction for exposure level
$R_I$=Assurance reduction for integrity assessment The reduction weights, in this particular implementation, correspond to elements in FIG. 4 as follows:

Volume of PHI, PII, etc. (412)-$R_V$ and $R_{HV}$
Integrity/malware (433)-$R_I$
Potential Avenues of Exploitation (434)-$R_E$
Configuration (436)-$R_E$
Location (438)-$R_E$ Each of the reduction weights ($R_{values}$) are assessed as follows:

$$R_I = \ln(\Sigma f(kb)) \times c$$

Where:
b=Integrity Weighting Multiplier
c=Integrity Weighting Coefficient
f(k)=Summation of individual records defined as highly valuable $$R_{HV} = \ln(\Sigma f(k)) \times a$$

Where:
a=Highly Sensitive Information Weighting Coefficient
f(k)=Summation of individual records defined as highly valuable $$R_V = \ln(\Sigma f(k))$$

Where:
f(k)=Summation of individual records defined as valuable, but not highly valuable $$R_E = \ln \sum_{k|n} f(k) \times L$$

Where:
f(k)=Summation of potential avenues of exploitation times Location (L) weight, divided by n A practical example of the foregoing is provided below.

Two hypothetical computers are scanned using the framework described herein. Computer A has the following characteristics:

| COMPUTER A | |
|---|---|
| [410] Impact of Potential Loss | |
| [412] Files with highly sensitive information | 100 |
| [412] Files with less sensitive information (but still considered sensitive) | 100 |
| [430] Probability of Loss | |
| [436] Deviations found from acceptable configuration | 87 |
| [438] Location/Type | Laptop |
| [434] Non-standard processes | 42 |
| [434] Non-standard running services | 32 |
| [434] Established network connections | 13 |
| [434] Network-accessible services | 18 |
| [434] Days since last audit | 7 |
| [434] Known vulnerabilities | 12 |
| [436] Missing patches | 12 |

| COMPUTER A (-continued) | |
|---|---|
| [433] Suspicious binaries (possible malware) | 2 |
| [433] Hidden executables | 2 |

| COMPUTER B | |
|---|---|
| [410] Impact of Potential Loss | |
| [412] Files with highly sensitive information | 200 |
| [412] Files with less sensitive information (but still considered sensitive) | 200 |
| [430] Probability of Loss | |
| [436] Deviations found from acceptable configuration | 87 |
| [438] Location/Type | Laptop |
| [434] Non-standard processes | 42 |
| [434] Non-standard running services | 32 |
| [434] Established network connections | 13 |
| [434] Network-accessible services | 18 |
| [434] Days since last audit | 7 |
| [434] Known vulnerabilities | 12 |
| [436] Missing patches | 12 |
| [433] Suspicious binaries (possible malware) | 0 |
| [433] Hidden executables | 0 |

In the above tables we see the two computers are identical, except for the following points:
Computer A has half the "sensitive" information Computer B has, yet has signs of potential compromise.
Computer B has twice as much "sensitive" information, yet no signs of compromise.
All other "potential avenues of exploitation" are the same in this case.

Recall that the risk score is assessed as:

$$Score = Score_{MAX} - R_{HV} - R_V - R_E - R_I$$

In this implementation, we will use a scale of zero to one hundred where one hundred is perfect, and zero is the worst score possible (in other words, zero is the lowest assurance score, or highest risk). Therefore, $Score_{MAX}$ will be equal to 100.

In this case:

$$R_{HV} = \ln(\Sigma f(k)) \times a$$

Where:
a=Highly Sensitive Information Weighting Coefficient, in this case "3"
f(k)=Summation of individual records defined as highly valuable So for computer A:

$$\ln(100) \times 3 = 13.81$$

As described previously, $R_V$ is the same as $R_{HV}$ without the highly sensitive weighting coefficient, so it is (again for computer A):

$$\ln(100) = 4.61$$

Repeating the above for Computer B, we calculate the following:

$$\ln(200) \times 3 = 15.89$$

$$\ln(200) = 5.29$$

Remember that:

$$R_E = \ln \sum_{k|n} f(k) \times L$$

Where:

f(k)=Summation of potential avenues of exploitation times Location (L) weight, divided by n. Because these are laptops, we'll set L to 3 in this example. The remainder will be the summation of all values of (434) and (436), with n equal to number of categories of (434) and (436).

So:

ln(223/8)×3=9.98

The above $R_E$ applies to both Computer A and Computer B, since they are the same in that regard.

And finally, we only assess the "integrity" weighting for Computer A because computer B has values of zero for all [433] assessment points.

$$R_1 = \ln (\Sigma f(kb)) \times c$$

Where:

b=Integrity Weighting Multiplier, in this implementation: 2 c=Integrity Weighting Coefficient, in this implementation: 10 f(k)=Summation of individual records defined as highly valuable

So, for Computer A only:

ln((2+2)*2 )×10=20.79

Now we can assess the score of each computer as follows:

Score Computer A=100−13.81−4.61−9.98−20.79=50.81

Score Computer B=100−15.89−5.29−9.98−0=68.84

We see a very interesting feature of this risk scoring in the above example. Even though Computer B has twice as much sensitive data on it, the algorithm has determined that Computer A is the higher risk because it has some signs of questionable integrity combined with some sensitive data at all. In this example, all other things being equal, Computer B would reach the threshold where both computers have the same risk values once it had close to about a half-million highly sensitive files on it.

Figure 5:
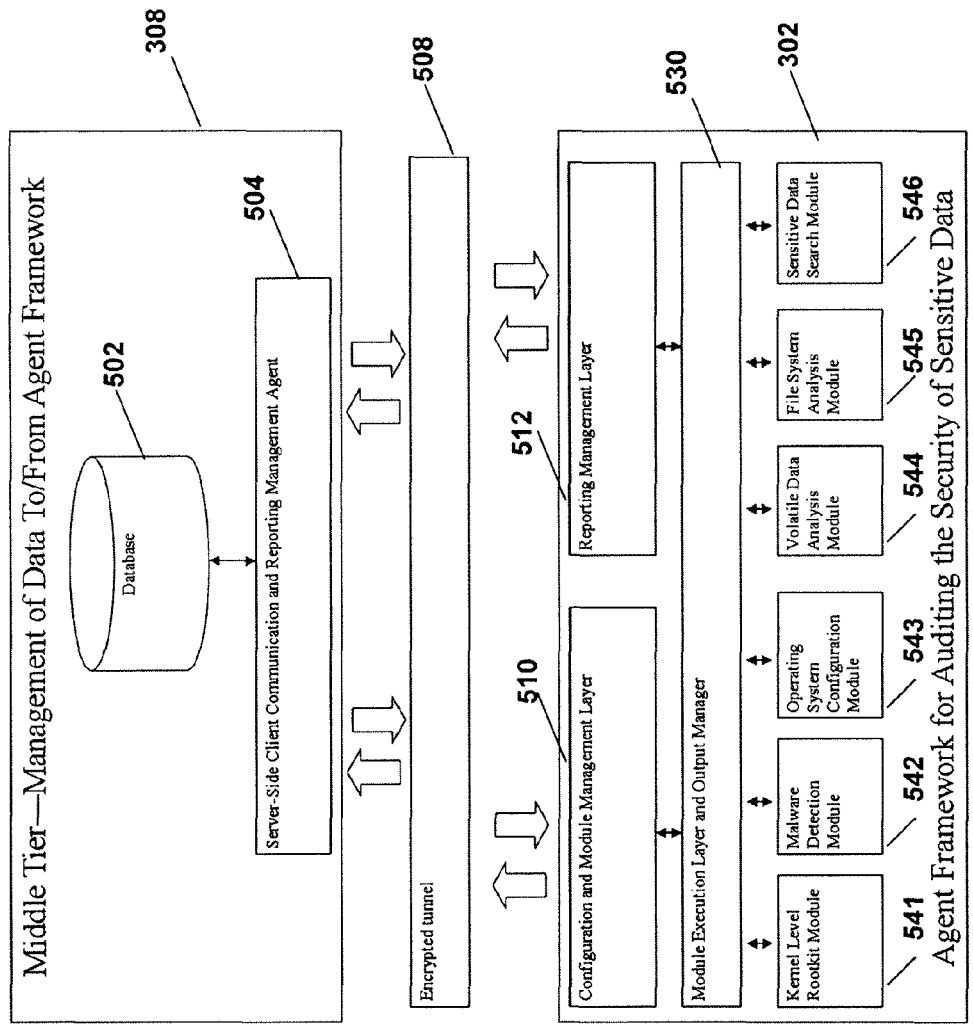
FIG. 5 shows an example agent framework for auditing the security of sensitive data in accordance with an embodiment of the present invention.

FIG. 5 shows an example agent framework for auditing the security of sensitive data in accordance with an embodiment of the present invention. A server 308 (e.g., the same as in FIG. 3) hosts a database 502 (although the database could be implemented separately) and a communication and reporting management module 504, which is responsible for communicating with agents 302 via, e.g., an encrypted tunnel 508, and with users. Each agent 302 (perhaps even implemented as an "agentless" function using binary code) may be configured to have various "layers" including configuration and module management layer 510, reporting management layer 512 and module execution layer and output manager 530. The latter layer 530 may be in communication with a plurality of modules that respectively perform aspects of the auditing function of the agent 302.

For example, module 541 provides kernel level rootkit analysis, module 542 provides malware detection, module 543 provides operating system configuration analysis, module 544 provides volatile data analysis, module 545 provides file system analysis, and module 546 provides sensitive data analysis/detection functionality. These modules operate to provide raw data (e.g., "findings") to server 308 via several layers as depicted in FIG. 5. Of course, those skilled in the art will appreciate that FIG. 5 depicts a logical representation of the components of agent 302 and sever 308. Other implementations and configurations are possible.

As explained, the agent 302, deployed once, periodically, or as needed, analyzes/audits the computer on which it is hosted, and sends its findings to the server on which a risk score can be calculated, and where similarly-calculated risk scores are compared. If a computer is deemed to have a relatively high risk score, remedial action can be initiated in an effort to reduce the risk of loss of data for the associated computer.

Figure 6:
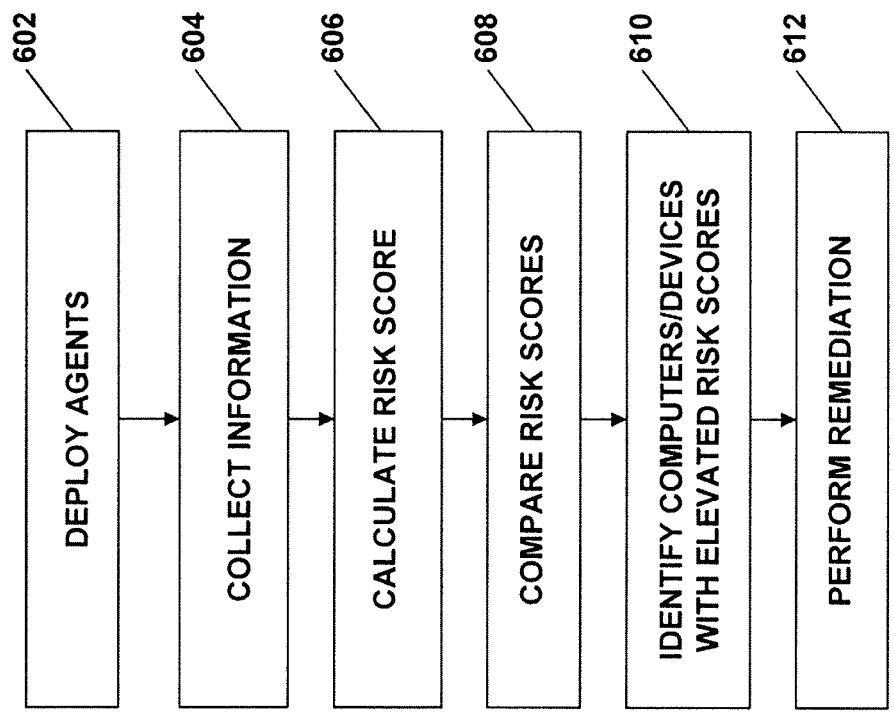
FIGS. 6-8 show flow charts of respective methods in accordance with embodiments of the present invention.
Figure 7:
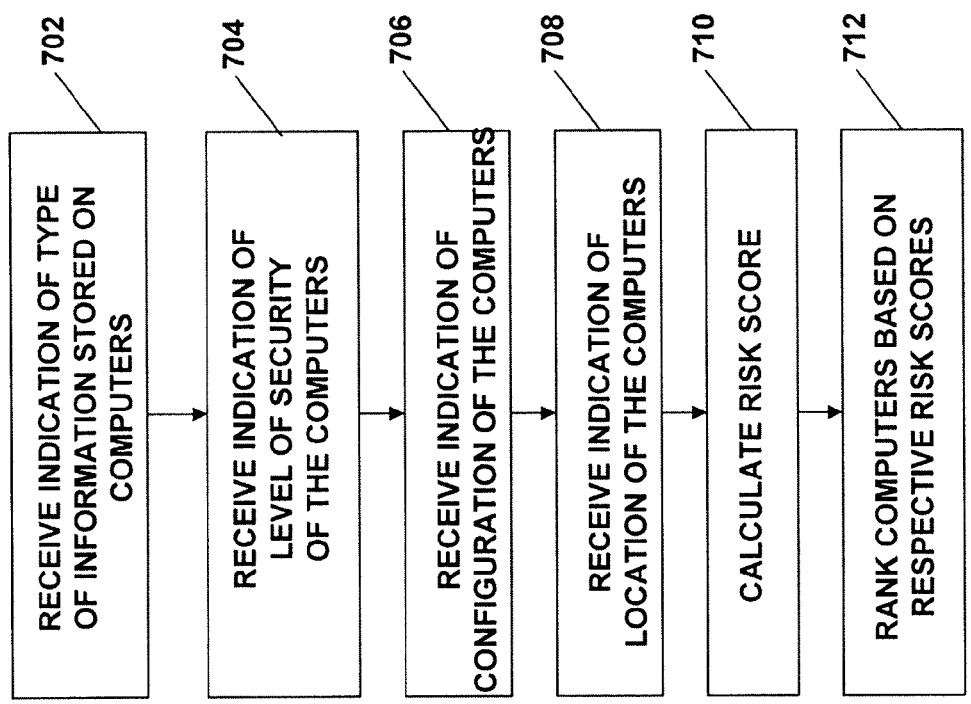
Figure 8:
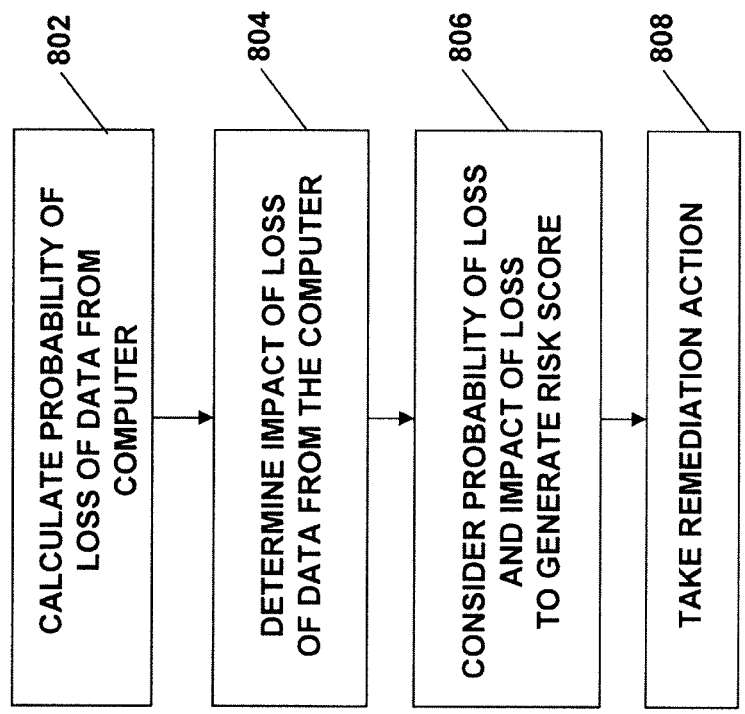

FIGS. 6-8 show flow charts of respective methods in accordance embodiments of the present invention, consistent with the foregoing.

Referring first to FIG. 6, there is shown a method wherein at step 602 agents are deployed, e.g., on respective computers among a plurality of computers throughout a computer network. At step 604, using the agents, information is collected about the type of data stored on the respective computers and the programs running on the respective computers. That information may then be received from the agents at a central location, e.g., a server, on a periodic basis or upon request.

Then, at step 606, for each computer having an agent deployed thereon, a risk score is calculated, where the risk score is based on the type of data stored on that computer and a security state of that computer. At step 608, the risk scores of multiple computers are compared and the computers are ranked in a risk score order.

At step 610, those computers ranking higher than others are deemed to be the most at risk for compromise. For at least those computers, some form of remediation is performed. Such remediation could include "removing" (e.g., deleting, moving, masking, encrypting), from a given one of the multiple computers in the ranking, the type of data that gave rise to an elevated risk score. The specific remediation technique may be performed by the agent 302 at the request FIG. 7 depicts a slightly different methodology wherein, at step 702, a central location, e.g., a server, receives, from respective computers in a network, an indication of the types of information that are stored on the computers. At step 704, the server receives, from respective computers in the network, an indication of a level of security for the computer, and further, at step 706, receives an indication of configuration of the computer. Based on, at least, the received information, a risk score is calculated at step 710 for each respective computer, and the computers are thereafter ranked at step 712 based on their respective risk scores. Again, the risk scoring can be performed directly by agents operating on the respective computers. In this way remedial action can be performed to reduce the risk of compromise to the higher ranked computers. It may at this point also be desirable to notify a user of the computer that certain sensitive data has been "removed" in some way, that remedial action has been taken on certain data, and/or that sensitive data is no longer accessible on that computer.

FIG. 8 illustrates yet another embodiment of a methodology of the present invention in which a probability of loss is calculated at step 802 for each of a plurality of computers, and an impact of loss of sensitive data from respective computers is determined at step 804. Using numerical techniques at step 806, the probability of loss and impact of loss are considered together to generate a risk score for individual computers. At step 808, remedial action is preferably taken in an effort to reduce the risk score, and effectively overall risk, associated with selected computers.

It should be noted that third party technology may be available to provide metrics described herein, and thus the agent 302 need not necessarily generate all inputs used to calculate a risk score.

The systems and methods described herein may be embodied in other specific forms without departing from the spirit or essential characteristics thereof The foregoing embodiments are therefore to be considered in all respects illustrative and not meant to be limiting.

What is claimed is:

1. A computer network auditing method, comprising:
   deploying agents on respective computers among a plurality of computers throughout a network;
   using the agents to collect information about the volume and sensitivity of data stored on the respective computers and the programs running on the respective computers;
   receiving the information from the agents at a central location;
   for each computer for which the information has been received, calculating a risk score, where the risk score is based on the volume and sensitivity of data stored on said each computer and a security of said each computer;
   comparing, at the central location, calculated risk scores of multiple computers and ranking the multiple computers in a risk score order; and
   for a given one of the multiple computers in the risk score order, performing a remediation technique that has the effect of reducing the risk score for the given computer,
   wherein calculating the risk score comprises separately taking account of (i) for a given one of the computers, data considered to be of a first sensitivity value stored on the given one of the computers, (ii) data considered to be of a second sensitivity value, different form the first sensitivity value, stored on the given one of the computers, (iii) an exposure level of the data stored on the given one of the computers, and (iv) an integrity assessment of the given one of the computers, and
   wherein the risk score is based on a probability of loss that is itself based on the exposure level of the data stored on the given one of the computers and the integrity assessment of the given one of the computers, and an impact of loss metric that is itself based on the first and second sensitivity values.

2. The method of claim 1, further comprising pushing the agents from a server to the respective computers.

3. The method of claim 1, further comprising receiving the information from the agents via a secure encrypted tunnel.

4. The method of claim 1, further comprising applying weights to variables associated with the type of data stored on respective computers and associated with metrics of security for the respective computer.

5. The method of claim 4, wherein the variables or metrics include at least one of number of pieces of malware, number of rootkits, number of hidden files, days since last audit, running programs, network connections, potential network connections, confirmed signature-based vulnerabilities, confirmed mis-configurations, or network location/role of the computer.

6. The method of claim 1, wherein the remediation technique comprises at least one of deleting, encrypting, or moving data on or from the given one of the multiple computers.

7. The method of claim 1, wherein the remediation technique comprises changing a configuration, uninstalling an application, installing an application, executing an application, or disabling a running service on the given one of the multiple computers.

8. The method of claim 1, further comprising notifying a user of the given one of the multiple computers that data has been removed from the computer.

9. The method of claim 1, wherein data considered to be of the fist sensitivity value comprises at least one of social security numbers and credit cards numbers.

10. The method of claim 1, wherein data considered to be of the second sensitivity value comprises telephone numbers.

11. A method of monitoring a network of computers, comprising;
    receiving, from respective computers in the network, an indication of the volume and sensitivity of information stored thereon;
    receiving, from the respective computers in the network, an indication of a level of security thereof;
    receiving, from the respective computers in the network, an indication of configuration of the respective computer;
    calculating a risk score for each respective computer based on the volume and sensitivity of information, security and configuration of each respective computer; and
    ranking the computers based on their respective risk scores,
    wherein calculating the risk score comprises separately taking account of (i) for a given one of the computers, data considered to be of a first sensitivity value stored on the given one of the computers, (ii) data considered to be of a second sensitivity value, different from the first sensitivity value, stored one the given one of the computers, (iii) an exposure level of the data stored on the given one of the computers, and (iv) an integrity assessment of the given one of the computers, and
    wherein the risk score is based on a probability of loss that is itself based on the exposure level of the data stored on the given one of the computers and the integrity assessment of the given one of the computers, and an impact of loss metric that is itself based on the first and second sensitivity values.

12. The method of claim 11, further comprising performing a remediation technique on a highest ranking computer of the computers subjected to ranking.

13. The method of claim 11, wherein the remediation technique comprises at least one of deleting, encrypting, or moving data on the highest ranking computer.

14. The method of claim 11, wherein the remediation technique comprises changing a configuration, uninstalling an application, installing an application, executing an application, or disabling a running service on the highest ranking computer.

15. The method of claim 11, further comprising notifying a user of the highest ranking computer that data has been removed from the computer.

16. The method of claim 11, wherein data considered to be of the first sensitivity value comprises at least one of social security numbers and credit cards numbers.

17. The method of claim 11, wherein data considered to be of the second sensitivity value comprises telephone numbers.

* * * * *